United States Patent
Gnanasekaran et al.

(10) Patent No.: US 12,518,057 B2
(45) Date of Patent: Jan. 6, 2026

(54) SYSTEM AND METHOD FOR A GENERATIVE ARTIFICIAL INTELLIGENCE MODEL GATEWAY

(71) Applicant: HARTFORD FIRE INSURANCE COMPANY, Hartford, CT (US)

(72) Inventors: Senthilkumar Gnanasekaran, Harrisburg, NC (US); Agastya Kommanamanchi, South Windsor, CT (US); Shrujan Jyotindrabhai Mistry, Harrisburg, NC (US); Renoi Thomas, Thornwood, NY (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 145 days.

(21) Appl. No.: 18/489,361

(22) Filed: Oct. 18, 2023

(65) Prior Publication Data
US 2025/0131126 A1  Apr. 24, 2025

(51) Int. Cl.
*G06F 21/62* (2013.01)
*G06F 40/55* (2020.01)

(52) U.S. Cl.
CPC .......... *G06F 21/6254* (2013.01); *G06F 40/55* (2020.01)

(58) Field of Classification Search
CPC ............. G06F 21/6245; G06F 21/6254; G06F 40/55; H04L 63/0428
USPC ............................................. 726/26; 713/193
See application file for complete search history.

(56) References Cited

U.S. PATENT DOCUMENTS

| | | | |
|---|---|---|---|
| 9,582,680 B2 | 2/2017 | Bilodeau et al. | |
| 10,223,548 B2 | 3/2019 | Bilodeau et al. | |
| 10,839,104 B2 | 11/2020 | Balzer et al. | |
| 11,496,446 B1 | 11/2022 | Angara et al. | |
| 12,153,884 B1* | 11/2024 | Kowall | G06N 20/00 |
| 2015/0213288 A1 | 7/2015 | Bilodeau et al. | |
| 2017/0177904 A1 | 6/2017 | Bilodeau et al. | |
| 2022/0138345 A1 | 5/2022 | Krishnan et al. | |
| 2022/0358237 A1 | 11/2022 | Banipal et al. | |
| 2023/0112921 A1* | 4/2023 | Cai | G06F 8/31 717/104 |
| 2023/0195928 A1 | 6/2023 | Sridhar | |
| 2024/0354436 A1* | 10/2024 | Mukherjee | G06F 16/3344 |
| 2024/0394404 A1* | 11/2024 | O'Neal | G06F 21/6245 |
| 2024/0427994 A1* | 12/2024 | Odland | G06F 21/6245 |
| 2025/0005299 A1* | 1/2025 | Padmanabhan | G06F 16/335 |
| 2025/0103746 A1* | 3/2025 | Gharibi | G06F 21/6227 |
| 2025/0112768 A1* | 4/2025 | Ho | G06F 21/602 |
| 2025/0190459 A1* | 6/2025 | Conway | G06N 3/0475 |

OTHER PUBLICATIONS

NPL Search Terms (Year: 2025).*

* cited by examiner

*Primary Examiner* — Syed A Zaidi
(74) *Attorney, Agent, or Firm* — Buckley, Maschoff & Talwalkar LLC

(57) ABSTRACT

According to some embodiments, systems and methods are provided, including receiving a prompt; determining, by at least one of an image component and a text component, a personal identifiable information (PII) status for the prompt; returning a PII response; receiving selection of a large language model (LLM) in a case the PII status is PII-free; determining a large language model status; transmitting the prompt to the selected LLM based on the large language model status; and receiving a large language model (LLM) output. Numerous other aspects are provided.

20 Claims, 19 Drawing Sheets

GATEWAY FOR AI INTERACTIONS

← Back ▾ ⇨ ▾ ⊗ ⌂ 🔍Search ☆Favorites ♫Media ...

WELCOME TO AI GATEWAY TOOL

Message to be Vetted:

[ Is phone number 5555555555 belong to Joe? ]

[Choose File]  [Submit] —402  [Reset]

Vetted Response: (optional)

[ Payload vetting done. The request contains PII elements. Please sanitize the message. The PII elements found are: phone number: 5555555555 ]

[Add Model]  [Send to AI]

Model 1:
Model [LLM 1 ▼]
Max Token [500]
Response
[Response Message]

FIG. 4

GATEWAY FOR AI INTERACTIONS

WELCOME TO AI GATEWAY TOOL

Message to be Vetted:

Is this a real driver's license?

Choose File   Submit

Vetted Response: (optional) — 702

Payload vetting done. The request contains PII elements. Please sanitize the message. The PII elements found are: phone number: 704-555-5556, address: 12345 YOUR STREET.

Reset

Add Model   Send to AI

Model 1:
Model  LLM 1 ▶
Max Token  500
Response
Response Message

FIG. 7

GATEWAY FOR AI INTERACTIONS
⇦ Back ▾ ⇨ ▾ ⊗ ⌂ | ⊕Search ☆Favorites ⊕Media ⊕ | 🖼▾ 📂 🗐 ☰

WELCOME TO AI GATEWAY TOOL

Message to be Vetted:

Where is DWA in state of CT? —— 804

[Choose File]    [Submit] —— 810    [Reset]

Vetted Response: (optional)

Response message

[Add Model]    [Send to AI]

Model 1:
Model  [LLM 1 ▸]
Max Token [500]
Response
Response Message

GATEWAY FOR AI INTERACTIONS

← Back → ↔ ⊗ ⌂ | ⌕Search ☆Favorites ⟲Media ...

WELCOME TO AI GATEWAY TOOL

Message to be Vetted:

Where is DWA in state of CT?

Choose File   Submit   Reset

Vetted Response: (optional) — 902

Payload vetting done. NO PII elements are found in the request.

318 —

Add Model   Send to AI

Model 1:
Model  LLM 1 ▶ — 320
Max Token  500
Response
Response Message

FIG. 9

SYSTEM AND METHOD FOR A GENERATIVE ARTIFICIAL INTELLIGENCE MODEL GATEWAY

BACKGROUND

Generative Artificial Intelligence (AI) refers to models or algorithms that create brand-new output, such as text, photos, videos, code, data or 3D renderings, from vast amount of data they are trained on. Generative AI allows users to quickly generate new content based on a variety of input. Products including, but not limited to, ChatGPT®, OpenAPI®, etc. are natural language generative AI processing tools that allow a user to refine and steer a human-like conversation towards a desired length, format, style, level of detail and language used. These products offer large language models (LLMs) that can execute a number of text-processing tasks, such as receiving a small amount of input text to generate relevant machine-generated text. The LLMs may generate text and/or content based on context being provided to the LLM (e.g., based on a question posed to the LLM). As a non-exhaustive example, a user may ask the LLM for the "the highest mountain," and the LLM will return text generated in a natural way that answers the question, and may then be used to further refine the question/answer. The LLMs are outside of the control of an enterprise, which may pose a challenge to the enterprise, as a question directed from an enterprise to the LLM, and the answer provided by the LLM, may include sensitive data and may be stored and otherwise used by the LLM. In some instances, where LLMs are available for employee usage, 8-11% of employees knowingly or unknowingly send personal identifiable information (PII) to these LLMs.

It would be desirable to provide improved systems and methods to provide a tool that regulates information sent to an LLM. Moreover, the tool should be easy to access, understand, update, etc.

SUMMARY OF THE INVENTION

According to some embodiments, systems, methods apparatus, computer program code and means are provided to regulate information egressed from an enterprise.

Some embodiments are directed to a system implemented via a back-end application computer server of an enterprise. The system comprises: (a) the back-end application computer server, coupled to the data store, including: a computer processor; a computer memory coupled to the computer processor and storing instructions that, when executed by the computer processor, cause the back-end application computer server to: receive a prompt; determine a personal identifiable information (PII) status for the prompt; return a PII response; receive selection of a large language model (LLM) in a case the PII status is PII-free; determine a large language model status; transmit the prompt to the selected LLM based on the large language model status; receive a large language model (LLM) output; and (b) a communication port coupled to the back-end application computer server to facilitate an exchange of data with a remote device to support interactive user interface displays that provide information about the LLM output.

Some embodiments are directed to a method implemented via a back-end application computer server of an enterprise. The method comprises receiving a prompt; determining, by at least one of an image component and a text component, a personal identifiable information (PII) status for the prompt; returning a PII response; receiving selection of a large language model (LLM) in a case the PII status is PII-free; determining a large language model status; transmitting the prompt to the selected LLM based on the large language model status; and receiving a large language model (LLM) output.

Other embodiments are directed to a non-transitory, computer-readable medium storing instructions adapted to be executed by a computer processor to perform a method comprising: receiving a prompt; determining, by at least one of an image component and a text component, a personal identifiable information (PII) status for the prompt; returning a PII response; receiving selection of a large language model (LLM) in a case the PII status is PII-free; determining a large language model status; transmitting the prompt to the selected LLM based on the large language model status; and receiving a large language model (LLM) output.

A technical effect of some embodiments is the improved and computerized AI egress gateway that provides fast, secure and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 4 is an outward view of a graphical user interface including an example response to the first prompt according to some embodiments.

FIG. 7 is an outward view of graphical user interface including an example response to the second prompt according to some embodiments.

FIG. 8 is an outward view of graphical user interface of a dashboard including a third prompt according to some embodiments.

FIG. 9 is an outward view of graphical user interface including an example response to the third prompt according to some embodiments.

Figure 1:
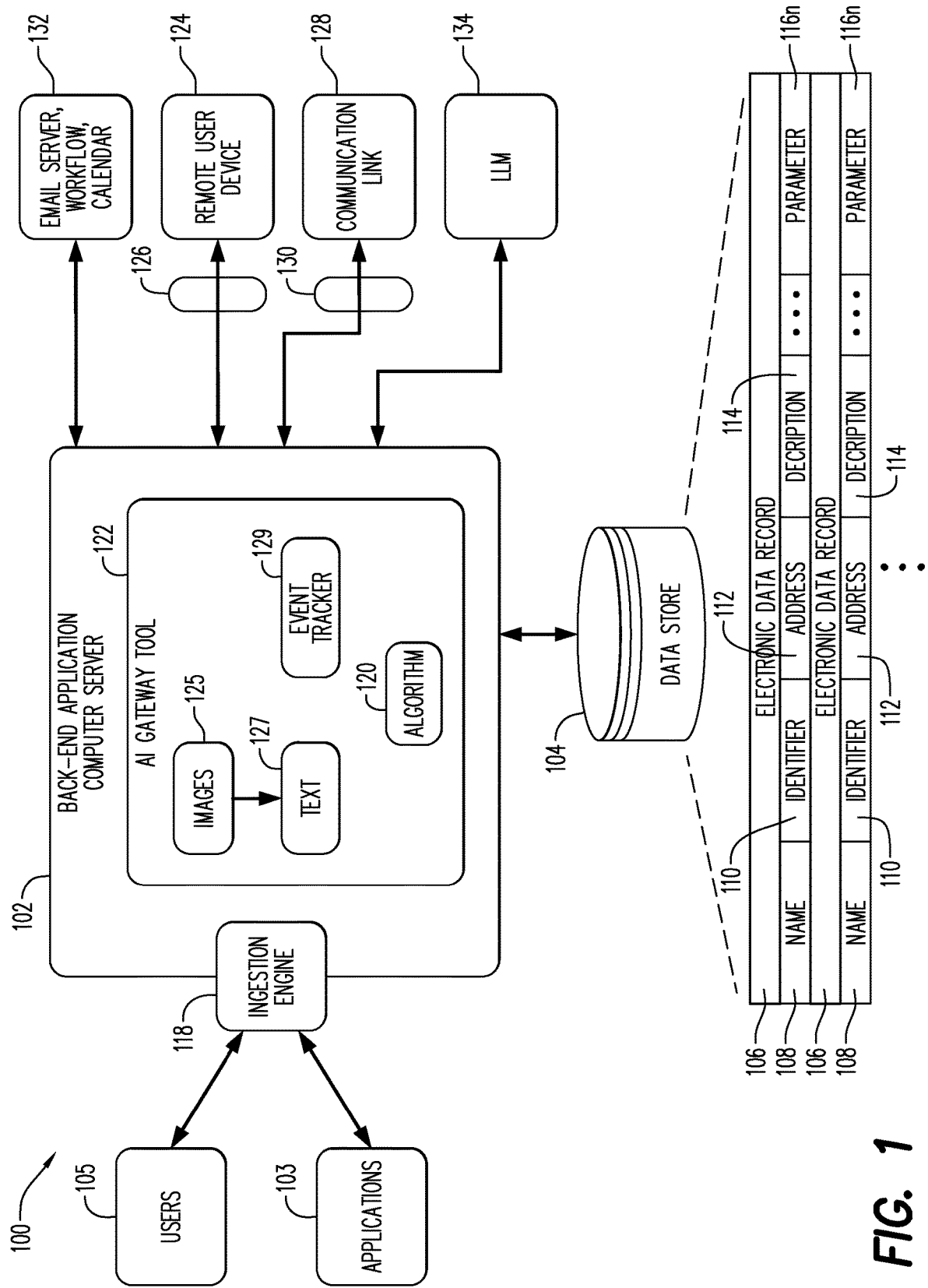
FIG. 1 is a block diagram of a system architecture according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

The present invention provides significant technical improvements to facilitate interactions with LLMs. The present invention is directed to more than merely a computer implementation of a routine or conventional activity previously known in the industry as it provides a specific advancement in the area of electronic record analysis by providing improvements in the operation of a computer system that monitors and selectively permits the egress of PII from an enterprise to a LLM. Some embodiments of the present invention are directed to a system adapted to flag and filter prompts containing PII information. Embodiments provide a tool that may "safely" enable use cases powered by generative AI products by restricting access to only enterprise-approved LLMs. Non-exhaustive examples of use cases include: a claims automobile document (e.g., prompt: Can you describe car damage in attached picture); enterprise third party exception management (e.g., prompt: How can I solve Oracle Connection Error "TNS Listener not found"); LLM comparisons (e.g., Team comparing responses from multiple LLMs and choosing the optimal one with appropriate cost); and Testing for custom trained LLMs (e.g., check for probable hallucinations, IP infringements).

The tool provided by embodiments may also log/track LLM calls, including monetization information around the LLM calls. With respect to monetization, it is noted that any call made to, and response provided by, the generative AI includes a cost. As a non-exhaustive example, consider two questions to the same LLM: Question 1 "can you give me the name of the highest mountain in the world?" and Question 2 "describe Mount Everest." The response to Question 1 may be a single sentence: "It's Mount Everest." The response to question 2 may be several sentences or a whole essay, for example. The writing of an essay may be more costly than a single sentence. To that end, embodiments may manage a length of a response that is received from the LLM. Embodiments may tag LLMs and track the costs incurred by certain applications and their use of the LLMs. The tracking may be via tokens associated with access to the LLM. Embodiments may also use alerts/alarms based on a set cost limit, as well as restrict further interactions with a particular LLM in a particular situation.

Embodiments may also provide for "prompt engineering"/prompt management whereby prompts are generated and provided to the LLM in such a way that the LLM gives the most accurate answer in a manner (e.g., length/format) that is expected. Prompt engineering may take the following into account: who the responses are for (e.g., user role), context (e.g., the highest mountain is needed for a hiking expedition or a 5th grade report), output format (e.g., how brief or descriptive they need to be (e.g., provide a response in 200 words or less), provide 2-3 types of answers users can choose from), the appropriate LLM behavior in a case the LLM could not derive a response, etc. As a non-exhaustive example, for a same prompt a response to a claims analyst may be different than a response to legal counsel. These features (e.g., role, context, output format) may be attached to the user prompt/query via an AI gateway tool, prior to sending the query to the LLM. Embodiments provide for the creation and management of multiple versions of prompts with respect to various LLMs. The multiple versions may also help with respect to testing various responses against the particular version of the prompt. Embodiments may also assign a certain set of additional prompts automatically to a given query/prompt based on a user profile. For example, based on a user role and organization, the AI gateway tool may append additional pre-configured prompts to a user input prompt/query. Embodiments may also provide for session management. For example, after a response to a prompt is received, the LLM may receive a follow-up question prompt (e.g., "can you please elaborate?"). This question may be stored as part of a particular session by the tool, and may be used for further analysis and/or reporting.

Some embodiments of the present invention are directed to aggregate data from multiple data sources, automatically optimize equipment information to reduce unnecessary messages or communications, etc. (e.g., to consolidate PII/prompt data). Moreover, communication links and messages may be automatically established, aggregated, formatted, modified, removed, exchanged, etc. to improve network performance (e.g., by reducing an amount of network messaging bandwidth and/or storage required to create prompt messages or alerts, improve security, reduce the size of a data store, more efficiently collect data, etc.).

Embodiments provide an AI gateway tool to facilitate the vetting of any egress traffic from an enterprise that is going to any generative AI models external to the enterprise. Conventionally, employees of the enterprise may use generative AI models (LLMs) to generate responses to prompts related to operations of the enterprise. As a non-exhaustive example, consider an insurance claims group asking the LLM for a photo and description involving an automobile accident. The insurance claims group expects the LLM to describe the photo, including the damage on the automobile based on the photo. Once that description/output of the LLM is received, the insurance claims group may be able to record that damage as part of the claim with minimal effort. As used herein, the terms "prompt", "query", "question" may be used interchangeably. As described above, 8-11% of employees of an enterprise knowingly or unknowingly send personal identifiable information (PII) to the LLMs. A challenge for the enterprise is that they do not have control over how the LLM treats the received PII and other enterprise confidential information, making the data more susceptible to the possibility of confidentiality breaches and data privacy violations. For example, the LLM may use the data for training their models, to make their capabilities more robust, to be used by other parties, etc. Another challenge with LLMs is that the generated response provided by the LLMs may not be reliable, as the LLM may lack context, to some extent. For example, in a case an LLM does not know an answer, the LLM may "hallucinate"/make up an answer, resulting in incorrect/unexpected responses. To address these challenges, the AI gateway tool acts as a gateway allowing applications 103/users 105 to safely interact with LLMs that have been approved by the enterprise. The AI gateway tool may also provide reliable responses that are not misleading or inaccurate, as well as restrict answers to a particular format. Continuing with the automobile example described above, before the insurance claims group can categorize the claim, they want to make sure the LLM output is not misleading or inaccurate to the extent that the claim cannot be categorized and required more effort on their part. Pursuant to some embodiments, the AI gateway tool may implement rigorous quality checks, support User Acceptance Testing (UAT), compare models side-by-side and trace user sentiments.

FIG. 1 is a high-level block diagram of an AI gateway system 100 that may be provided according to some embodiments of the present invention. In particular, the system 100 includes a back-end application computer server 102 that may access information in a data store 104 (e.g., storing a set of electronic records associated with employees of an enterprise, each record 106 including, for example, enterprise data: a name 108, an identifier 110, an address 112, a description 114, other parameters 116n, etc.). The back-end application computer server 102 may also store information into other data stores (not shown), and utilize an ingestion engine 118 and algorithm 120 of an AI gateway tool 122 to: analyze a prompt including the identification of any PII that may be contained in the prompt. In the case the prompt is PII-free (e.g., does not contain any PII), the AI gateway tool 122 may control access to generative AI models (LLMs), such that only approved LLMs 134 may receive the prompt, and may view, analyze, and/or update the electronic records. The AI gateway tool 122 further includes an image component 125, a text component 127, and an event tracker component 129.

The image component 125 and the text component 127 may identify the PII information in the prompt. The image component 125 and the text component 127 may also sanitize (e.g., hide/remove) the PII information in the prompt before the prompt is sent to the LLM 134. The image component 125 may make the identification and/or sanitization in images included in the prompt using an internally trained ML model, or may use an external service, including but not limited to, an image sanitization service, Amazon Rekognition®, Amazon Textract®. With respect to the internally trained ML model, the image component 125 may access a previously created internal learning store that may be fed by enterprise content (e.g., data stored in the data store 104). In the case of the external service, the image component 125 may receive the image of the prompt and execute the external service. The text component 127 may make the identification and/or sanitization in the text included in the prompt using an internally trained ML model, or may use an external service, including, but not limited to, Amazon Comprehend®, RegEx®. With respect to the internally trained ML model, the text component 127 may access a previously created internal learning store that may be fed by enterprise content (e.g., data stored in the data store 104). In the case of the external service, the text component 127 may receive the text of the prompt and execute the external service. The external service accessed by each of the image component 125 and the text component 127 may have been trained on internet content as of a certain date (e.g., one-two years prior to the present date). Pursuant to some embodiments, after the image component 125 identifies and/or sanitizes an image, the image may be transmitted to the text component 127 for further PII detection and sanitization.

The event tracker component 129 may log and track the particular prompts and responses from a given LLM. The event tracker component 129 may use a Postgre SQL tracking database, or any other suitable tracker. A reporting component (not shown) may receive data from the event tracker component 129 for performing further analysis of the data. A non-exhaustive example of the reporting component may be Tableau®. Pursuant to some embodiments, the event tracker component 129 may include the reporting component. The event tracker component 129 may generate an alert in a case a user attempts to transmit PII or other confidential information to an LLM, as further described below. The logged and tracked events may also be used by the AI gateway tool 122 for monetization processes.

The back-end application computer server 102 may also exchange information with a remote user device 124 (e.g., via a firewall 126). The back-end application computer server 102 may also exchange information via communication links 128 (e.g., via communication port 130 that may include a firewall) to communicate with different systems. The back-end application computer server 102 may also transmit information directly to an email server, workflow application, and/or calendar application 132 to facilitate automated communications and/or other actions. The back-end application computer server 102 may also transmit (via a firewall) information (e.g., prompts) to LLMs 134 after being approved by the AI gateway tool 122. According to some embodiments, an interactive graphical user interface platform of the back-end application computer server 102 may facilitate resource management, schedule recommendations, alerts, and/or the display of results via one or more remote administrator computers (e.g., to display the response to the prompt) and/or the remote user device 124. For example, the remote user device 124 may transmit a prompt and/or updated information regarding a record to the back-end application computer server 102. Based on the prompt/updated information, the back-end application computer server 102 may adjust data in the data store 104, and the change may (or may not) be used in connection with other systems. Note that the back-end application computer server 102 and/or any of the other devices and methods described herein may be associated with a third party, such as a vendor that performs a service for an enterprise (e.g., image processing, text processing).

The back-end application computer server 102 and/or the other elements of the system 100 may be, for example, associated with a Personal Computer ("PC"), laptop computer, smartphone, an organization server, a server farm, and/or a database or similar storage devices. According to some embodiments, an "automated" back-end application computer server 102 (and/or other elements of the system 100) may facilitate the automated access and/or update of electronic records in the data stores 104 and/or the management of resources. As used herein, the term "automated" may refer to, for example, actions that can be performed with little (or no) intervention by a human.

Devices, including those associated with the back-end application computer server 102 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 102 may store information into and/or retrieve information from the data store 104. The data stores 104 may be locally stored or reside remote from the back-end application computer server 102. As will be described further below, the data store 104 may be used by the back-end application computer server 102 in connection with an interactive user interface to access and update electronic records. Although a single back-end application computer server 102 is shown in FIG. 1, any number of such devices may be included. Moreover, various devices described herein might be combined according to embodiments of the present invention. For example, in some embodiments, the back-end application computer server 102 and data store 104 may be co-located and/or may comprise a single apparatus.

The elements of the system 100 may work together to perform the various embodiments of the present invention. Note that the system 100 of FIG. 1 is provided only as an example, and embodiments may be associated with additional elements or components. According to some embodiments, the elements of the system 100 automatically transmit information associated with an interactive user interface display over a distributed communication network. User interfaces 300, 500, 800, 1000, 1200, 1300, 1400, 1700, 1800, 1900, etc. may be presented on any type of display apparatus (e.g., desktop monitor, smartphone display, tablet display) provided by any type of client device (e.g., desktop system, smartphone, tablet computer). The application, which is executed to provide user interface 300, 500, 800, 1000, 1200, 1300, 1400, 1700, 1800, 1900, etc., may comprise a Web Browser, a standalone application, or any other application. Embodiments are not limited to user interface 300, 500, 800, 1000, 1200, 1300, 1400, 1700, 1800, 1900, etc.

Figure 2:
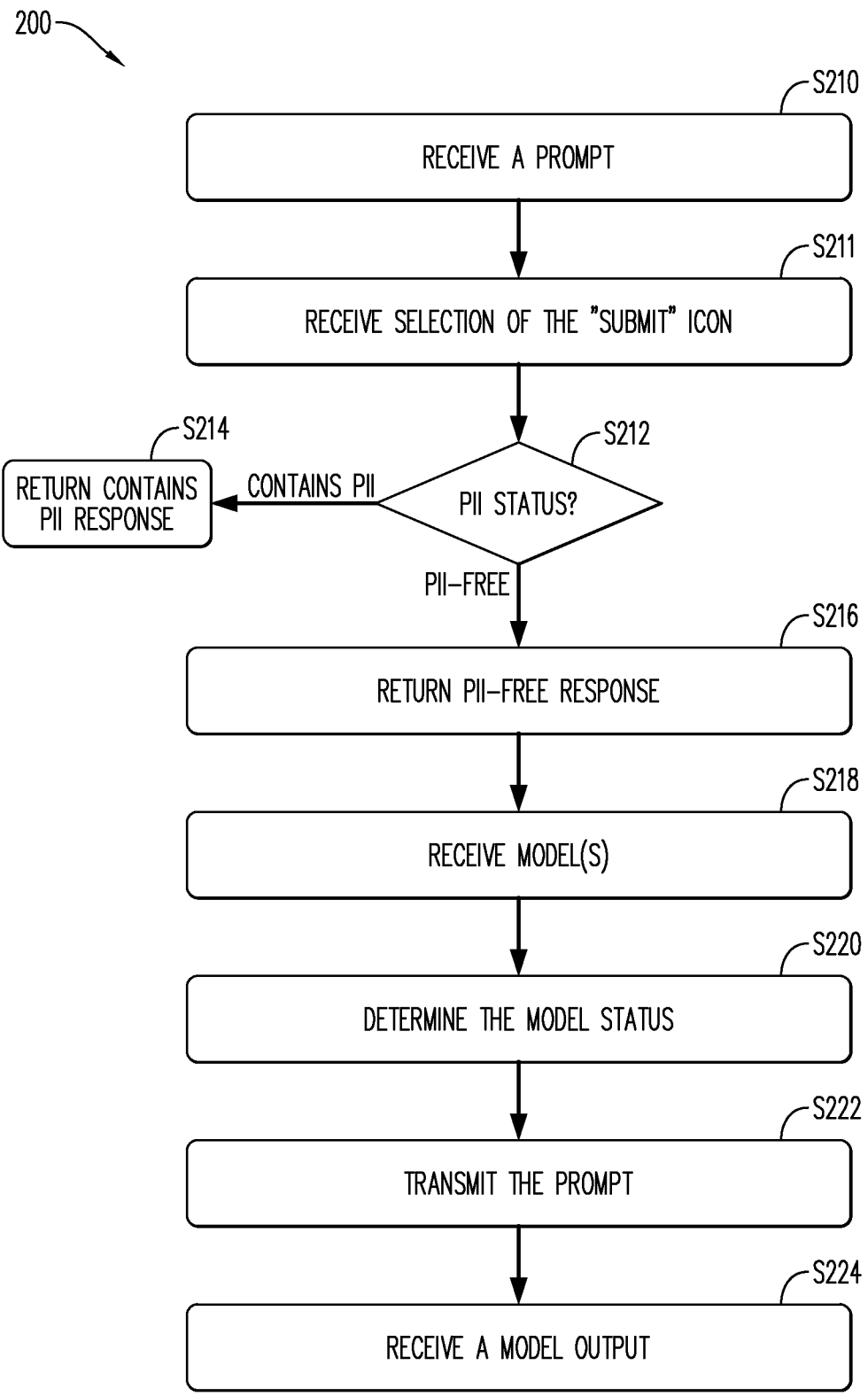
FIG. 2 is a flow diagram according to some embodiments.

FIG. 2 illustrates a method 200 that might be performed by some or all of the elements of the system 100 described with respect to FIG. 1, or any other system, according to some embodiments of the present invention. In one or more embodiments, the system 100 may be conditioned to perform the method 200 and any other processes described herein, such that a processor 1510 (FIG. 15) of the system 100 is a special purpose element configured to perform operations not performable by a general-purpose computer or device. The flow charts described herein do not imply a fixed order to the steps, and embodiments of the present invention may be practiced in any order that is practicable.

Note that any of the methods described herein may be performed by hardware, software, or any combination of these approaches. For example, a computer-readable storage medium may store thereon instructions that when executed by a machine result in performance according to any of the embodiments described herein. The instructions may be embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to execution of the method, the enterprise has established one or more LLMs as authorized to receive a prompt from the AI gateway tool 122. In addition to authorizing access to particular LLMs, the AI gateway tool 122 may further provide for application authentication, and authorization API key management, API key rotations, expiration of API keys for certain situations, activation/deactivation of models, etc. The AI gateway tool 122 may also provide for certain applications (e.g., different external/internal ones) to use specific LLMs. Based on application use case and requirements, only certain LLM interactions are enabled by embodiments, which may help with protecting against unforeseen costs and security of the data going out of the enterprise. Additionally, and also prior to the method 200, a user may access the AI gateway tool 122 and be provided with a welcome dashboard display in accordance with some embodiments, as described below with respect to FIG. 3. The welcome dashboard 300 may include a "Message to be Vetted" user entry field 302 adapted to receive a prompt 304 (e.g., message), and a "Vetted Response" field 306 to display an output 402 (shown in FIG. 4). The dashboard display 300 also includes navigation icons to "Choose file" 308, "Submit" 310 the prompt, "Reset" 312 the prompt, "Add model" 314, and "Send to AI" 316.

The dashboard display 300 may also include an LLM selection panel 318. Via the LLM selection panel 318, the user is able to select an LLM 320, a maximum token 322 and a type of response 324. User selection may be via drop-down menus, radio buttons, user entry fields, etc. It is noted that in some cases the LLM selection panel 318 may initially be presented on the display 300 and in other cases, the LLM selection panel 318 may be displayed in response to selection of the "Add model" icon 314.

Figure 3:
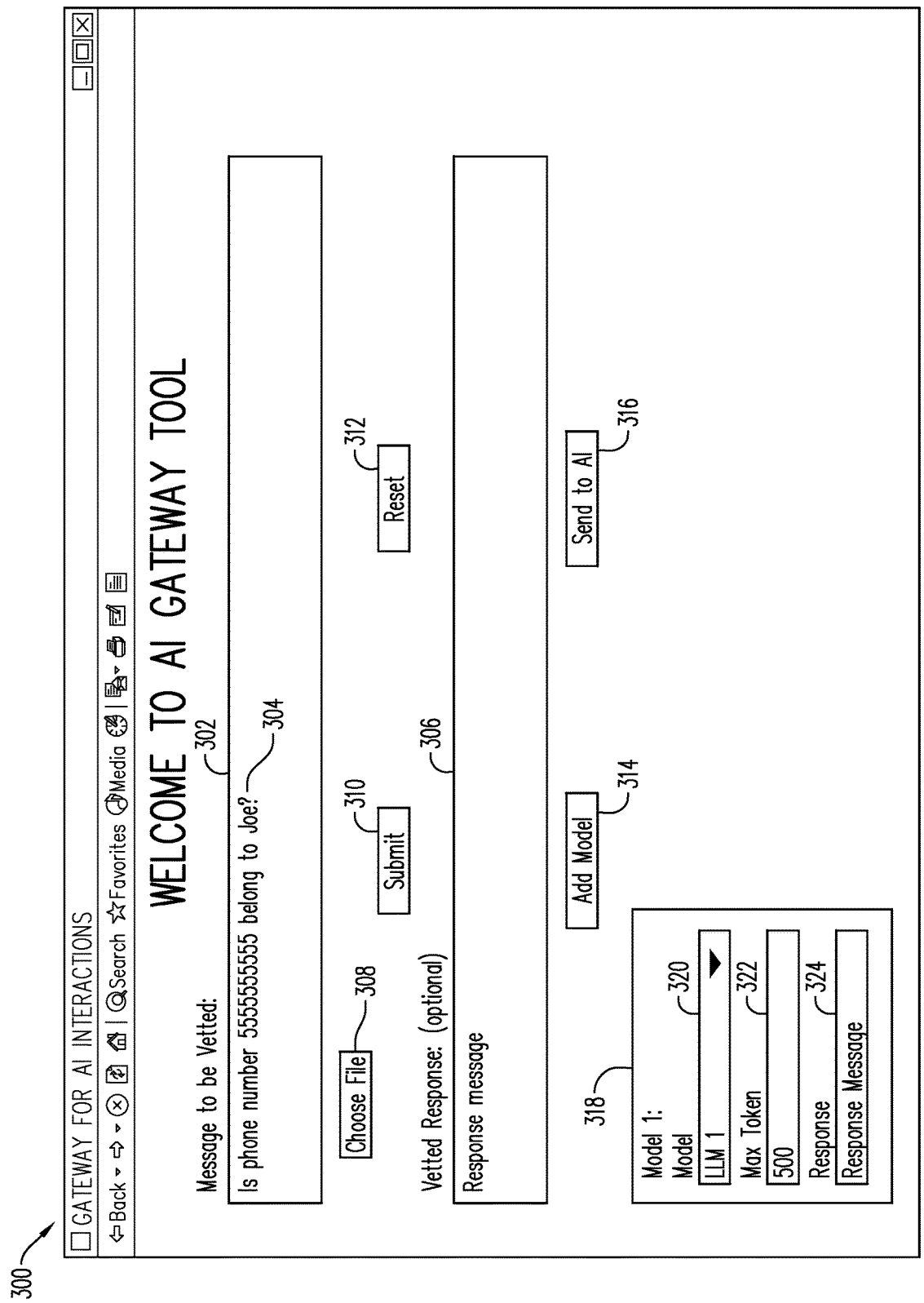
FIG. 3 is an outward view of a graphical user interface of a dashboard including a first prompt according to some embodiments.

Initially, at S210, a prompt 304 is received. The prompt 304 may be received from a user 105 in the "Message to be Vetted" user entry field 302. In FIG. 3, the prompt is "Does phone number 5555555555 belong to Joe." In other embodiments, the prompt may be received automatically and directly from an application 103, without user entry of text in a field.

The user then selects the "submit" 310 icon in S211.

In S212, a personal identifiable information (PII) status (e.g., "Contains PII" or "PII-free") is determined. PII uses data to confirm an individual's identity. Sensitive PII may include, but is not limited to, a full name, face, home address, social security number, passport number, birthdate, driver's license, financial information, medical records, finger prints or handwriting sample, email address, phone number, etc. The AI gateway tool 122 identifies PII and other confidential text in the prompt 304 via the image component 125 and the text component 127. As described above, the image component 125 and the text component 127 may analyze the prompt via an internal ML model to identify PII or confidential information, or may access an external service to identify PII so the image component 127 and text component 127 may determine the PII status (e.g., presence or absence of PII data). Continuing with the non-exhaustive example of FIG. 3, the text component 127 may determine the PII status of the prompt 304.

In a case it is determined at S212, PII status is "Contains PII", the method proceeds to S214 and a "Contains PII" output 402 (FIG. 4) is returned to the display in the Vetted Response field 306. The output 402 includes the PII status, and in the case of a "Contains PII" status, the output 402 further describes the PII included in the prompt. Additionally, in the case of the "Contains PII" status, the "Add model" icon 314 and "Send to AI" icon 316 are greyed out (as shown in FIG. 4) and not selectable by the user in response to the PII status of "Contains PII".

Continuing with the above-described example, in this case, the prompt 304 includes a phone number. At this stage, the output 402, shown in FIG. 4, includes a suggestion to sanitize the prompt. As used herein, "sanitization" may refer to hiding and/or removing the PII from the message/prompt. In some instances a user may remove the PII from the prompt. In other instances, the text component 127 (and/or image component 125) may sanitize the prompt. After sanitization, the sanitized prompt may be resubmitted via selection of the "submit" icon 310.

Figure 5:
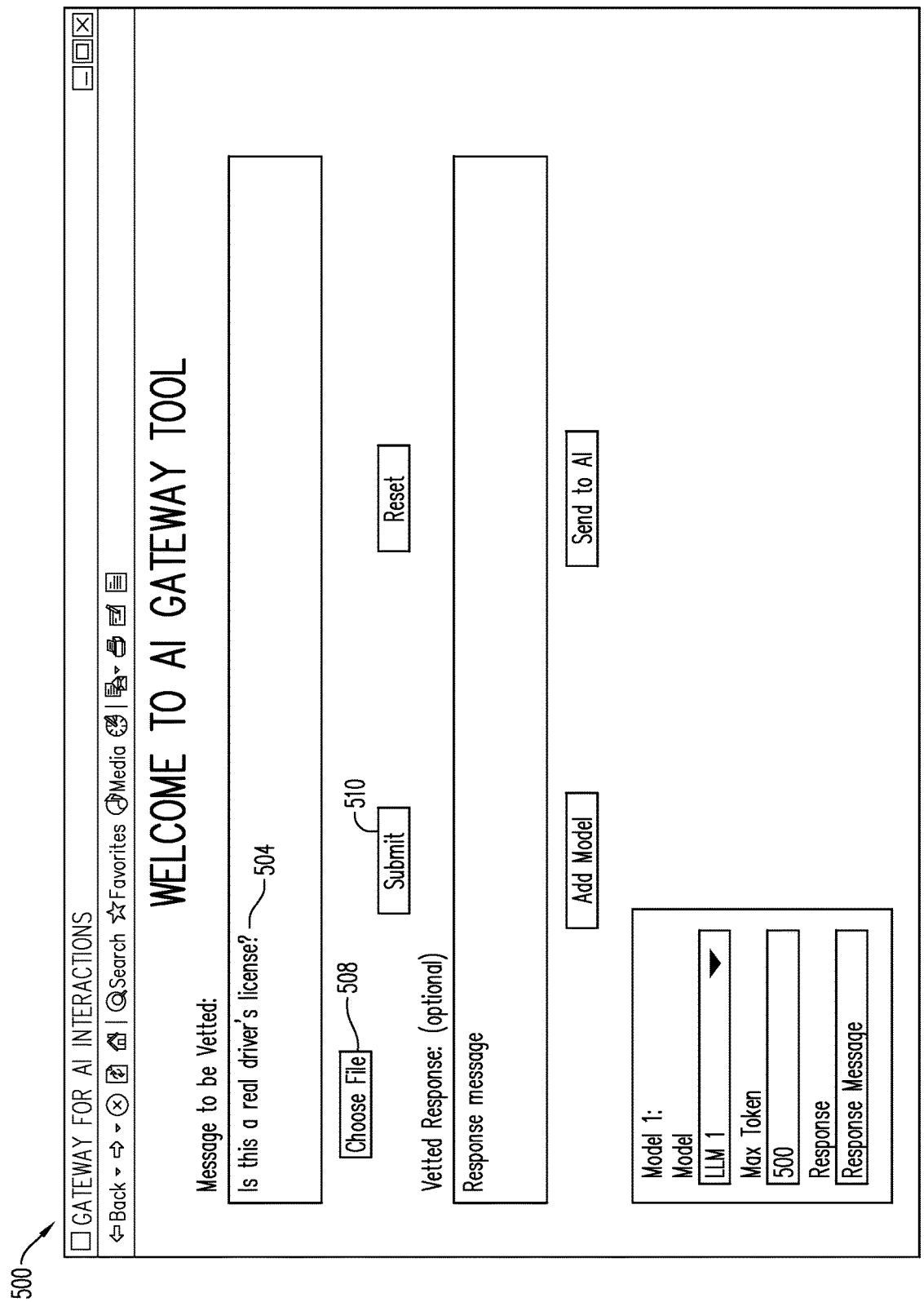
FIG. 5 is an outward view of graphical user interface of a dashboard including a second prompt according to some embodiments.
Figure 6:
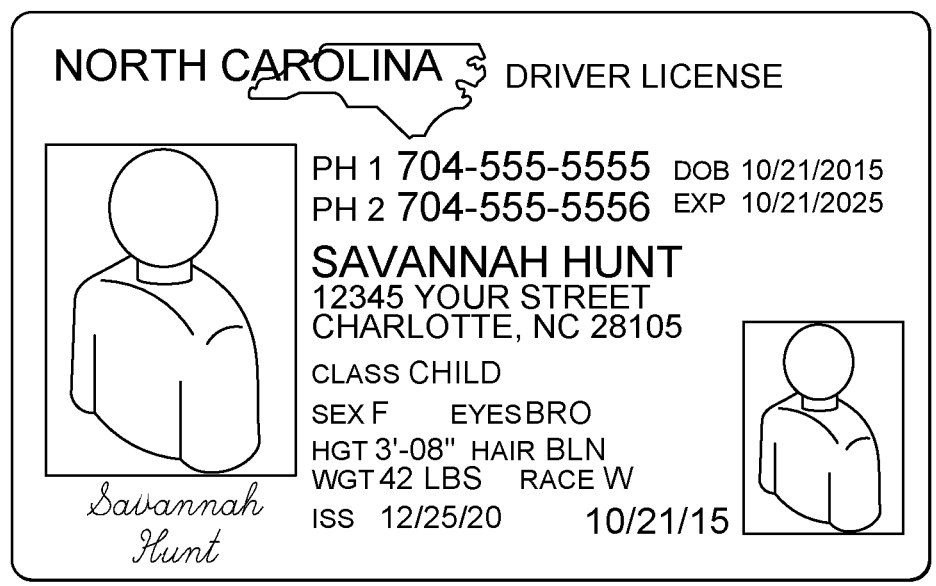
FIG. 6 is a non-exhaustive example of a file according to some embodiments.

Consider, as another non-exhaustive example, the dashboard 500 shown in FIG. 5. In this example, the prompt 504 is "Is this a real driver's license." Here, prior to selection of the "submit" icon 510, the user may select the "Choose file" icon 508. Selection of the "Choose file" icon may allow a user to upload a file from another location. Continuing with this example, the user may upload an image of a driver's license 600 (FIG. 6), and then select the "submit" icon 510, as in S211, described above.

Continuing with the example of FIG. 5, in this case, the prompt and uploaded image file include PII elements, as determined by the image component 125 and the text component 127. The output 702 (FIG. 7) indicates the prompt 504 includes a phone number and an address. Here, the output 702 also includes a suggestion to sanitize the prompt. Also shown herein, the "Add model" icon and "Send to AI" icon are greyed out and not selectable by the user in response to the PII status "Contains PII".

Turning back to the method 200, consider, as yet another non-exhaustive example, the dashboard 800 shown in FIG. 8. In this example, the prompt 804 is "Where is DWA in state of CT" (where DWA is "designated wind area"). Here the user may then select the "submit" icon 810, as in S211, described above. The text component 127 determines the PII status for the prompt is PII-free in S212. The method then proceeds to S216 and a "No PII elements" output 902 (FIG. 9) is returned to the display in the Vetted Response field.

Figure 10:
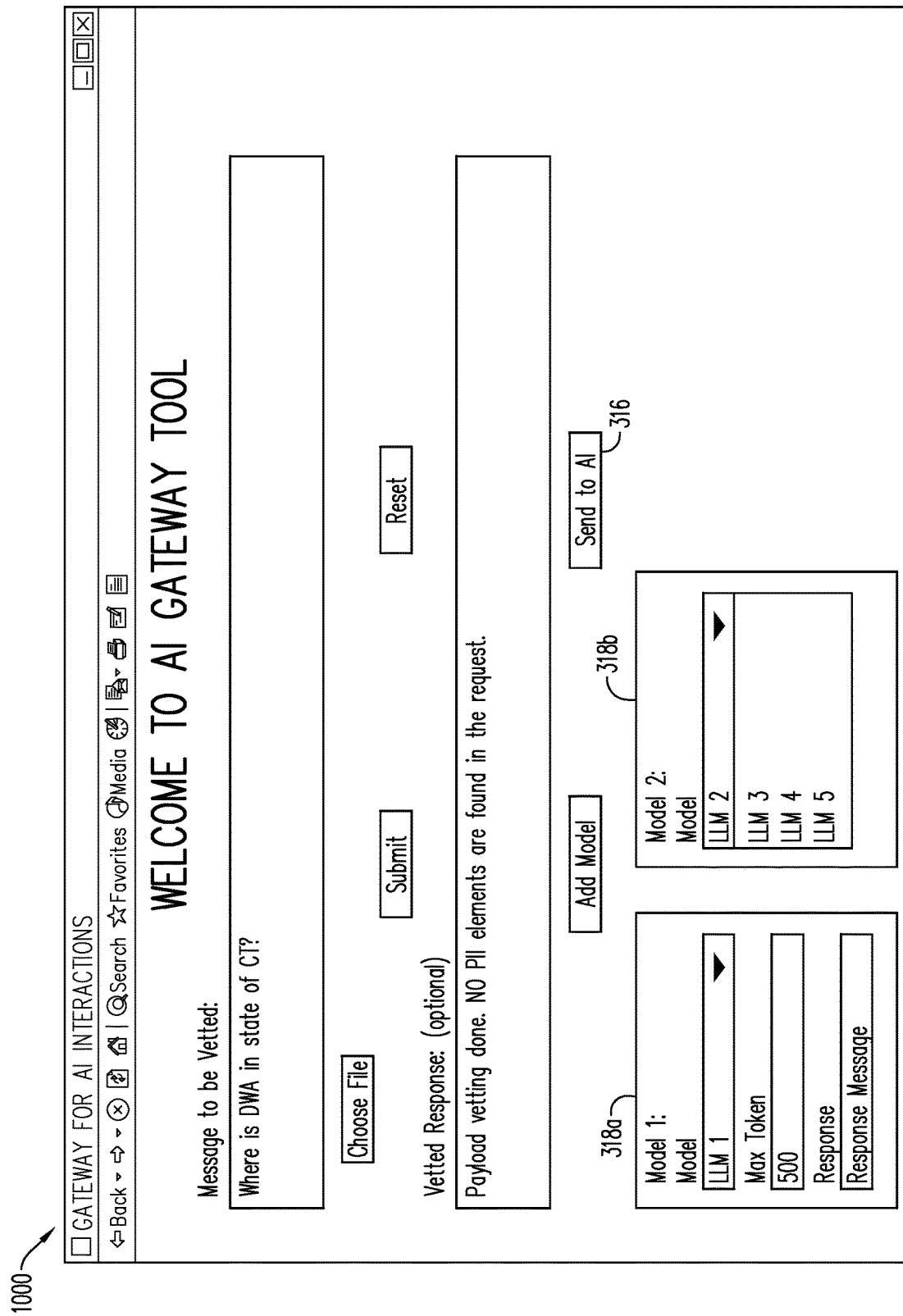
FIG. 10 is an outward view of a graphical user interface including models for the third prompt according to some embodiments.

Next in S218, at least one LLM 134 is received. The LLM 134 may be received via selection of an LLM 320 in a drop-down menu on the LLM selection panel 318. As described above, in other embodiments, the dashboard may be pre-populated with the LLM selection panel 318. In some embodiments, the LLM selection panel 318 is displayed in response to selection of the "add model" icon 314. It is noted that in a case the PII status is "PII-free", the "Add model" icon 314 and "Send to AI" icon 316 are selectable by a user. In either embodiment, after a first LLM selection panel 318a is displayed, the user may select the "Add model" icon 314 again to select a second LLM (318b), as shown in the display 1000 of FIG. 10. The user may want to send the same prompt to different LLMs to verify the LLM response, for example.

Figure 11:
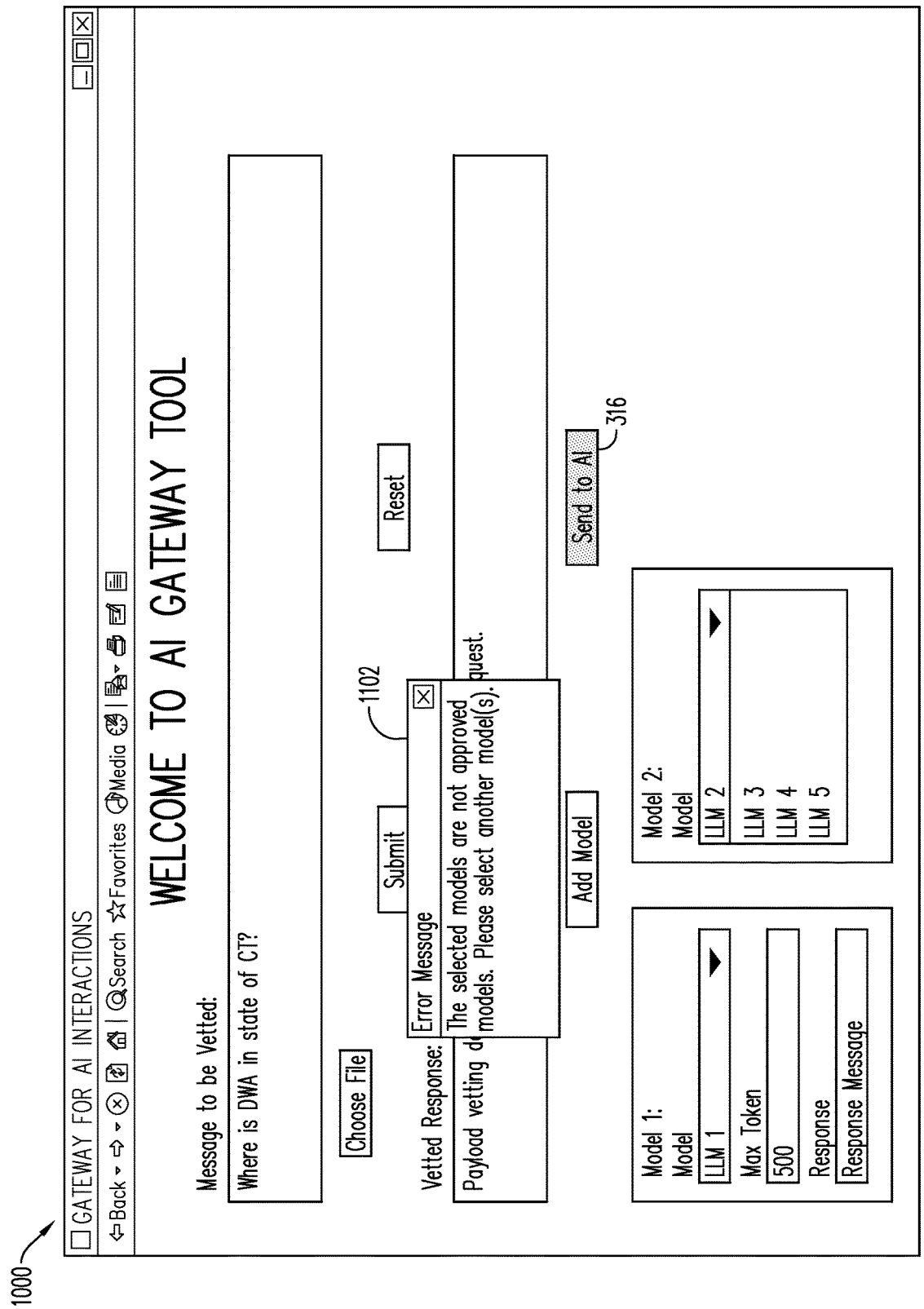
FIG. 11 is an outward view of a graphical user interface including selection of a model for the third prompt according to some embodiments.

The AI gateway tool 122 then determines a model status in S220. The model status may be approved or not approved. Pursuant to some embodiments the AI gateway tool 122 may make that determination based on a comparison of the selected model to a list of approved models or via other suitable process. In a case the selected models are not approved, the "Send to AI" icon 316 is greyed out and unavailable for selection, as shown in FIG. 11. The display 1000 shown in FIG. 11 may include an error message 1102 indicating the selected models are not approved models.

Figure 19:
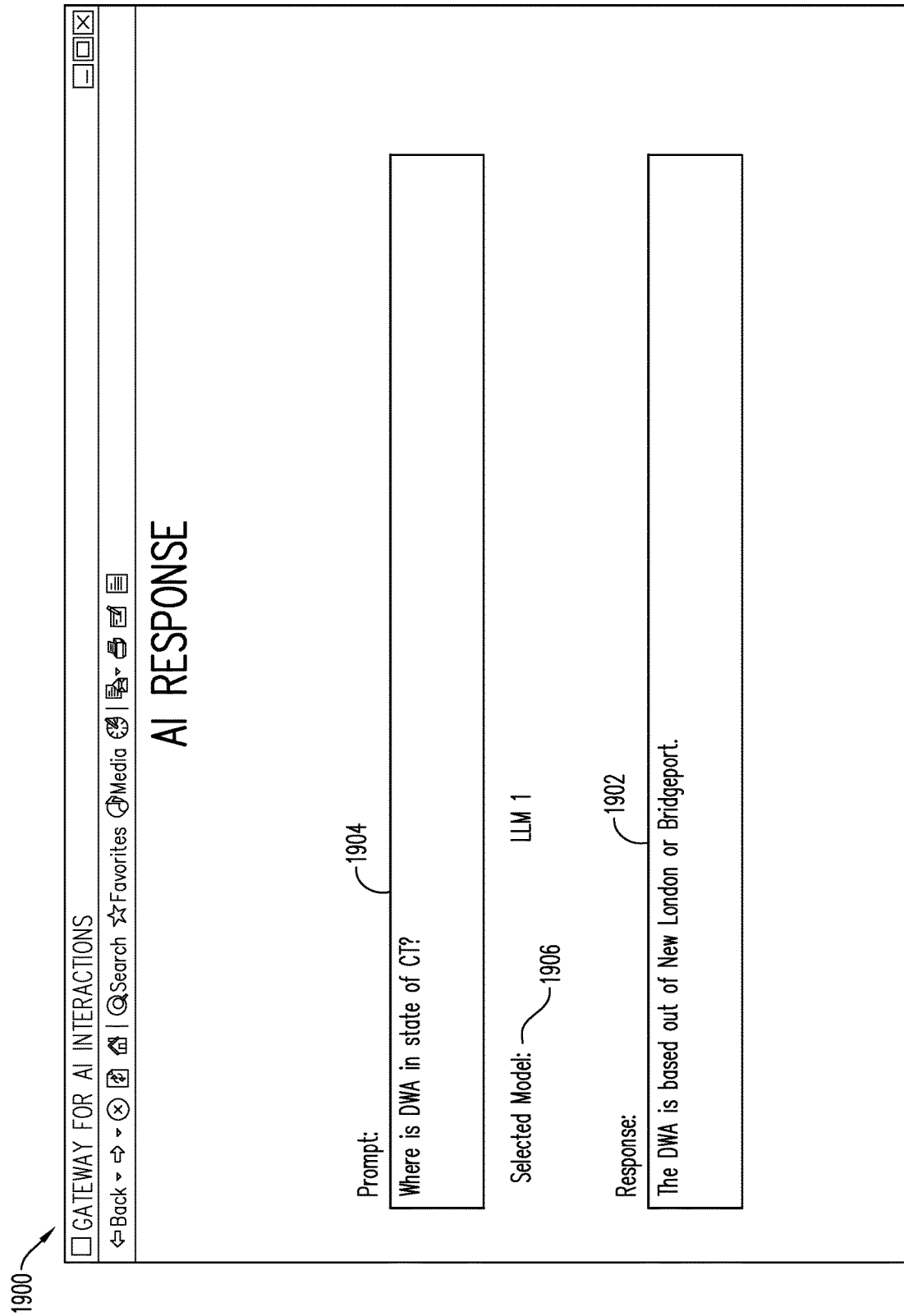
FIG. 19 is an outward view of non-exhaustive example of a response according to some embodiments.

In a case the selected models are approved, the prompt may be transmitted to the AI via selection of the "Send to AI" icon 316 in S222. The prompt may be transmitted via a suitable Application Programming Interface (API). Prior to transmission of the prompt, the AI gateway tool 122: may append any additional prompts, as described above, to the prompt for transmission to the LLM, and may append any formatting parameters for the response to the prompt. The LLM output/response 1902 may be received, via a suitable API, at the AI response user interface display 1900 in S224, as shown in FIG. 19. The AI response display 1900 may also include the prompt 1904 as sent to the LLM, and the selected LLM (model) 1906. Pursuant to some embodiments, based on the response 1902, additional prompts may be sent to the LLM per the AI gateway tool 122. Further, data stores may be updated with the response 1902, and the response may then be used to update existing internal models and create new internal models.

Figure 12:
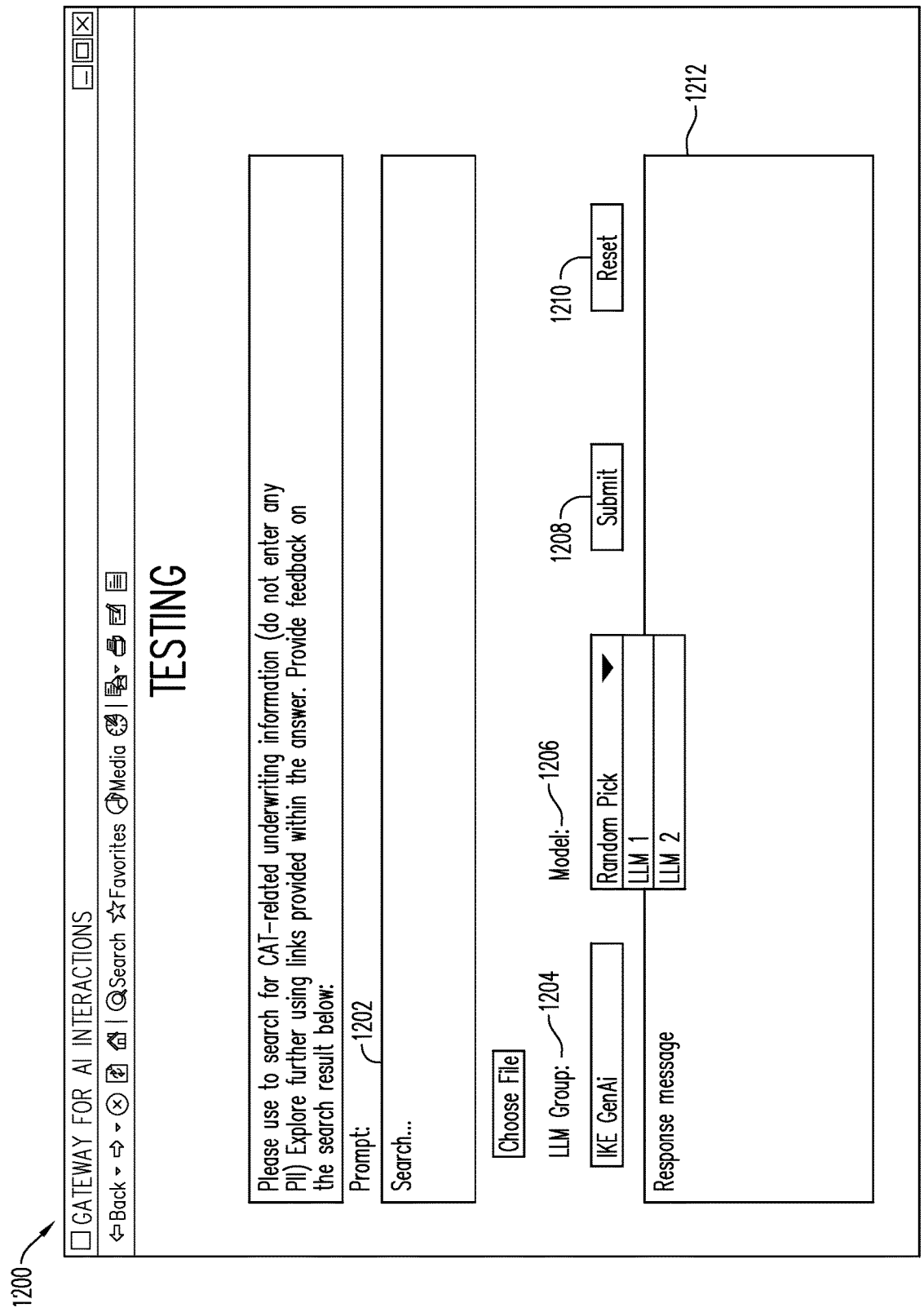
FIG. 12 is an outward view of a graphical user interface for a testing phase according to some embodiments.

Turning to FIG. 12, a test user interface display 1200 is provided for testing a specific use case. The display 1200 may include a prompt user entry field 1202, a selectable LLM group 1204, and a selectable model 1206. The enterprise may group LLMs by context or other suitable grouping to limit the particular LLMs that may be available for a particular use, prompt, etc. To that end, selection of an LLM group 1204 may result in only particular LLMs being made available as selectable models 1206, per an LLM group/model mapping table (not shown). Limiting the options provided on the display may reduce sued bandwidth, thereby improving operation of the system. The test UI display 1200 may also include a submit icon 1208, a reset icon 1210 and a response text box 1212. Pursuant to some embodiments, in response to an output provided by the selected model, that selected model may be scaled using data from an Information Knowledge Exchange (IKE) data store. Additionally, the IKE data store may be updated with the data included in the response. Further, based on the response, the AI gateway tool 122 may send additional prompts to the selected LLM to obtain further information.

Figure 13:
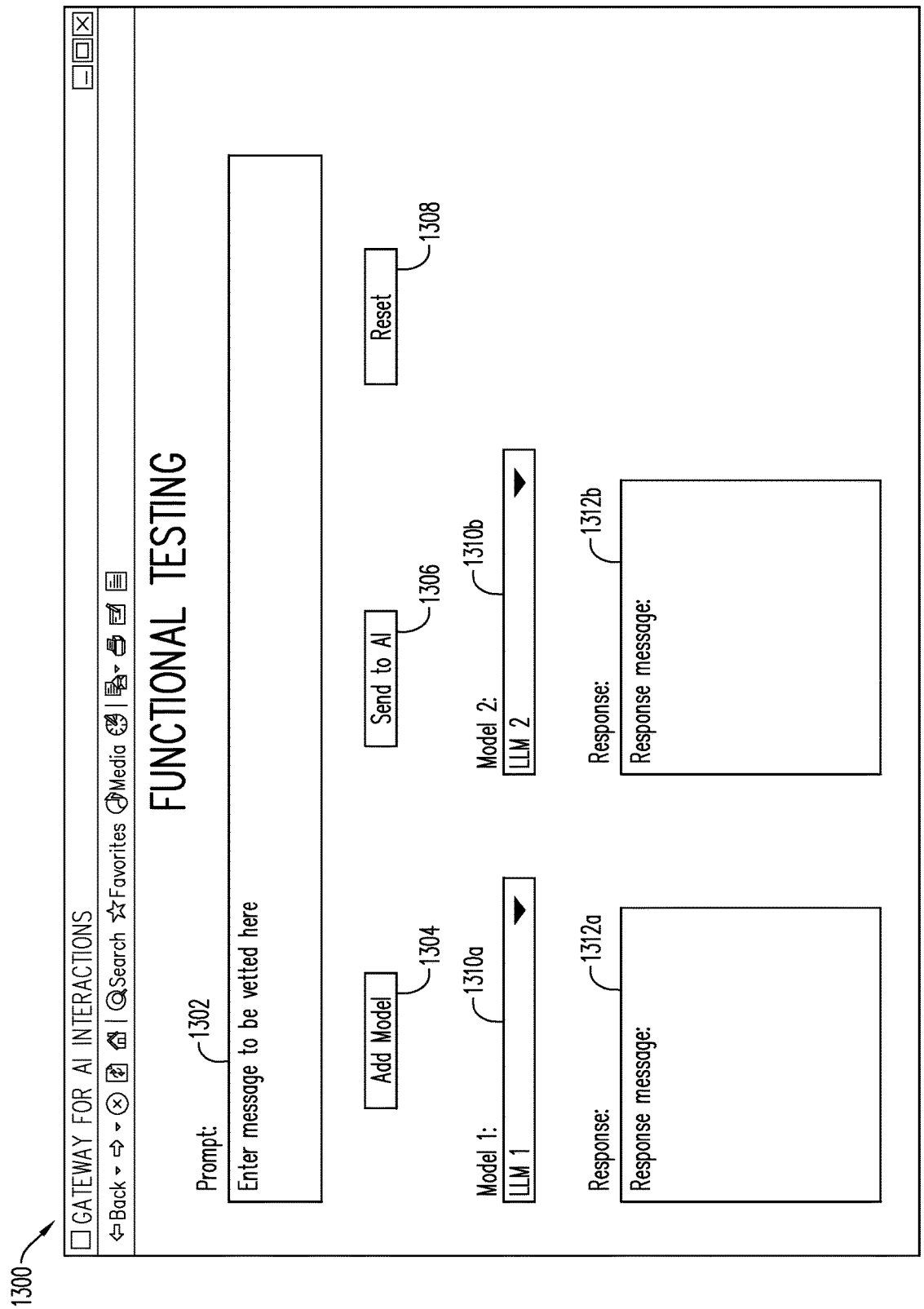
FIG. 13 is an outward view of another graphical user interface for a testing phase according to some embodiments.

Other testing may include testing two models against each other. For example, a same prompt may be sent to multiple models, as shown in the functional test display 1300 of FIG. 13, as a functional test may show how each particular model is responding to the prompt. The functional test display 1300 may provide a side-by-side response, accuracy, turnaround time, tokens and cost comparison of multiple LLM model. As a non-exhaustive example, one model may be less expensive than the other model, but may not provide as accurate a response. The user may then decide the weights to assign to the particular parameters (e.g., response, accuracy, turnaround time, tokens, cost). The functional test display 1300 may help a user select the right model by testing versions of various prompts against each other. The functional test display 1300 may include a prompt user entry field 1302, an add model icon 1304, a send to AI icon 1306 and a reset icon 1308. The functional test display 1300 may also include a selectable model 1310 (e.g., 1310a, 1310b), and a response window 1312 (e.g., 1312a, 1312b) for each selected model, where the response is displayed in the respective response window 1312 for the selected model. Pursuant to some embodiments, the AI gateway tool 122 may track, via the event tracker component 129, the prompts and responses within a database (or other data store) for further reporting.

Figure 14:
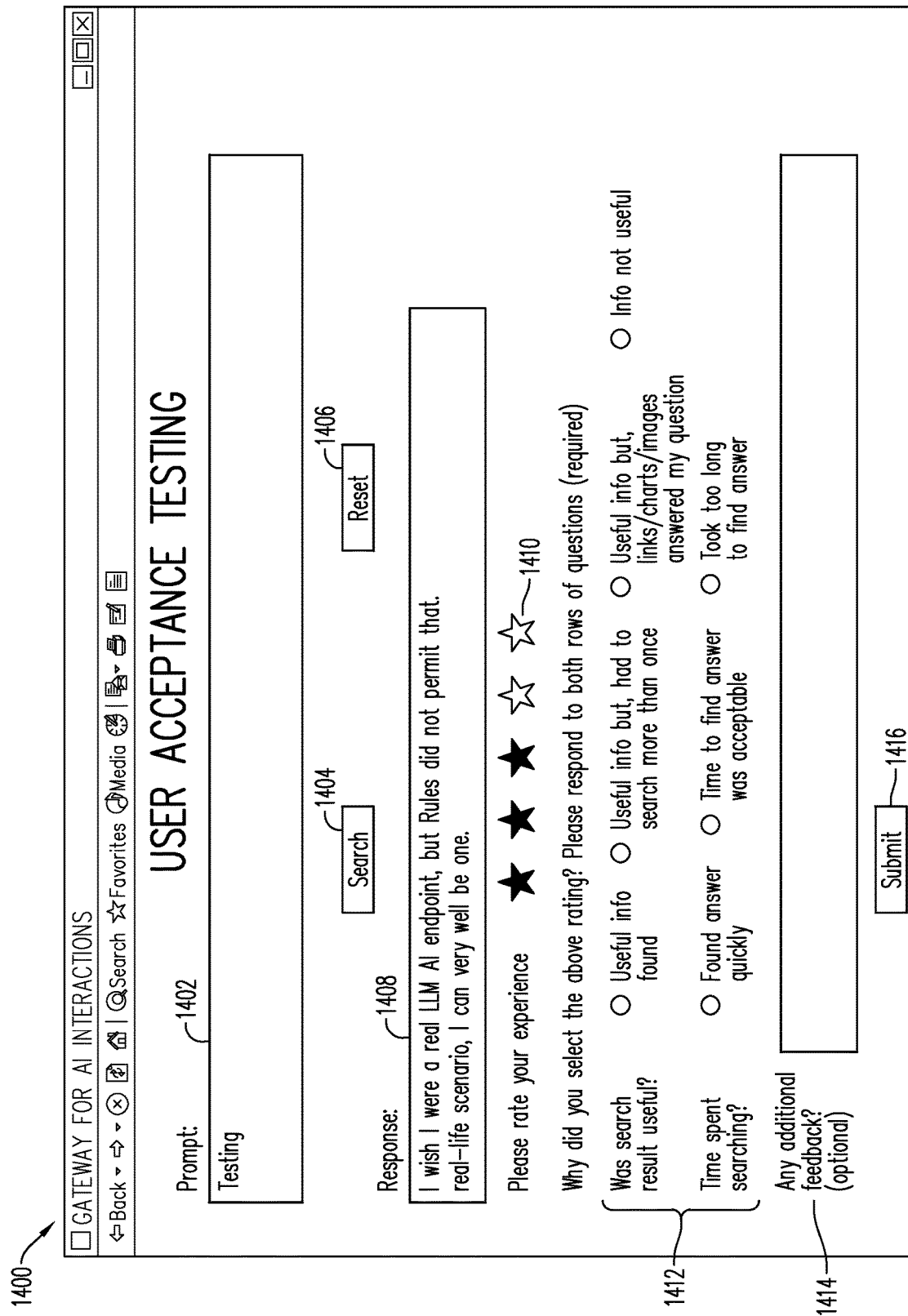
FIG. 14 is an outward view of yet another graphical user interface for a testing phase according to some embodiments.

Still another type of testing may include user acceptance testing via a user acceptance testing (UAT) display 1400 of FIG. 14. The UAT display 1400 may allow UAT users to randomly select generative AI LLMs and send in their prompts to assess different LLMs while avoiding user bias. The UAT display 1400 may include a prompt user entry field 1402, a "Submit" icon 1404, a "Reset" icon 1406 and a response window 1408. Unlike the functional test display, with the UAT display 1400, the AI gateway tool 122 (instead of a user) may select the model to receive the prompt and generate the response. The response may be displayed in the response window 1408. The UAT display 1400 may allow users to provide textual feedback via feedback icons 1410 (e.g., stars) to provide their feedback on the response provided by the LLM. The UAT display 1400 may also include follow-up questions 1412 regarding the user experience and a user entry field 1414 to include additional feedback. The question answers and optional feedback may be submitted via a "Submit" icon 1416. Pursuant to some embodiments, the AI gateway tool 122 (e.g., via the event tracker component 129) may track the prompts and responses within a database (or other data store) for further reporting.

Figure 15:
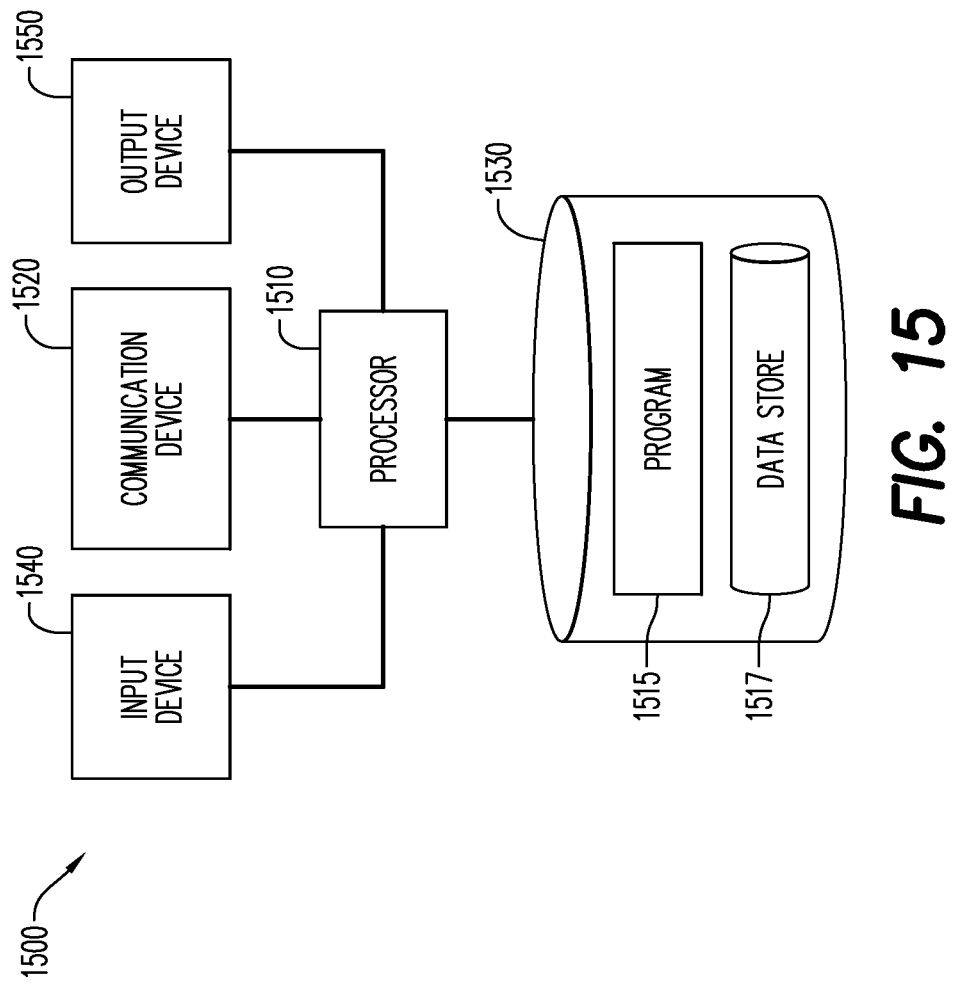
FIG. 15 is a block diagram of an apparatus according to some embodiments.

The embodiments described herein may be implemented using any number of different hardware configurations. For example, FIG. 15 illustrates an apparatus 1500 that may be, for example, associated with the system 100 described with respect to FIG. 1. The apparatus 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote third-party business or economic platforms, administrator computers, insurance agent, and/or communication devices (e.g., PCs and smartphones). Note that communications exchanged via the communication device 1520 may utilize security features, such as those between a public internet user and an internal network of an insurance company and/or an enterprise. The security features might be associated with, for example, web servers, firewalls, and/or PCI infrastructure. The apparatus 1500 further includes an input device 1540 (e.g., a mouse and/or keyboard to enter information about data sources, research data, state data, release dates, etc.) and an output device 1550 (e.g., to output reports regarding schedules, status, alerts, etc.).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1515 and/or an application for controlling the processor 1510. The processor 1510 performs instructions of the program 1515, and thereby operates in accordance with any of the embodiments described herein. For example, the processor 1510 may a receive a prompt to send to an LLM. The processor 1510 may then automatically vet the prompt and the LLM and then send the prompt to the LLM.

The program 1515 may be stored in a compressed, uncompiled and/or encrypted format. The program 1515 may furthermore include other program elements, such as an operating system, a database management system, and/or device drivers used by the processor 1510 to interface with peripheral devices.

As used herein, information may be "received" by or "transmitted" to, for example: (i) the apparatus 1500 from another device; or (ii) a software application or module within the apparatus 1500 from another software application, module, or any other source.

In some embodiments (such as shown in FIG. 15), the storage device 1530 further includes a data store 1517.

Figure 16:
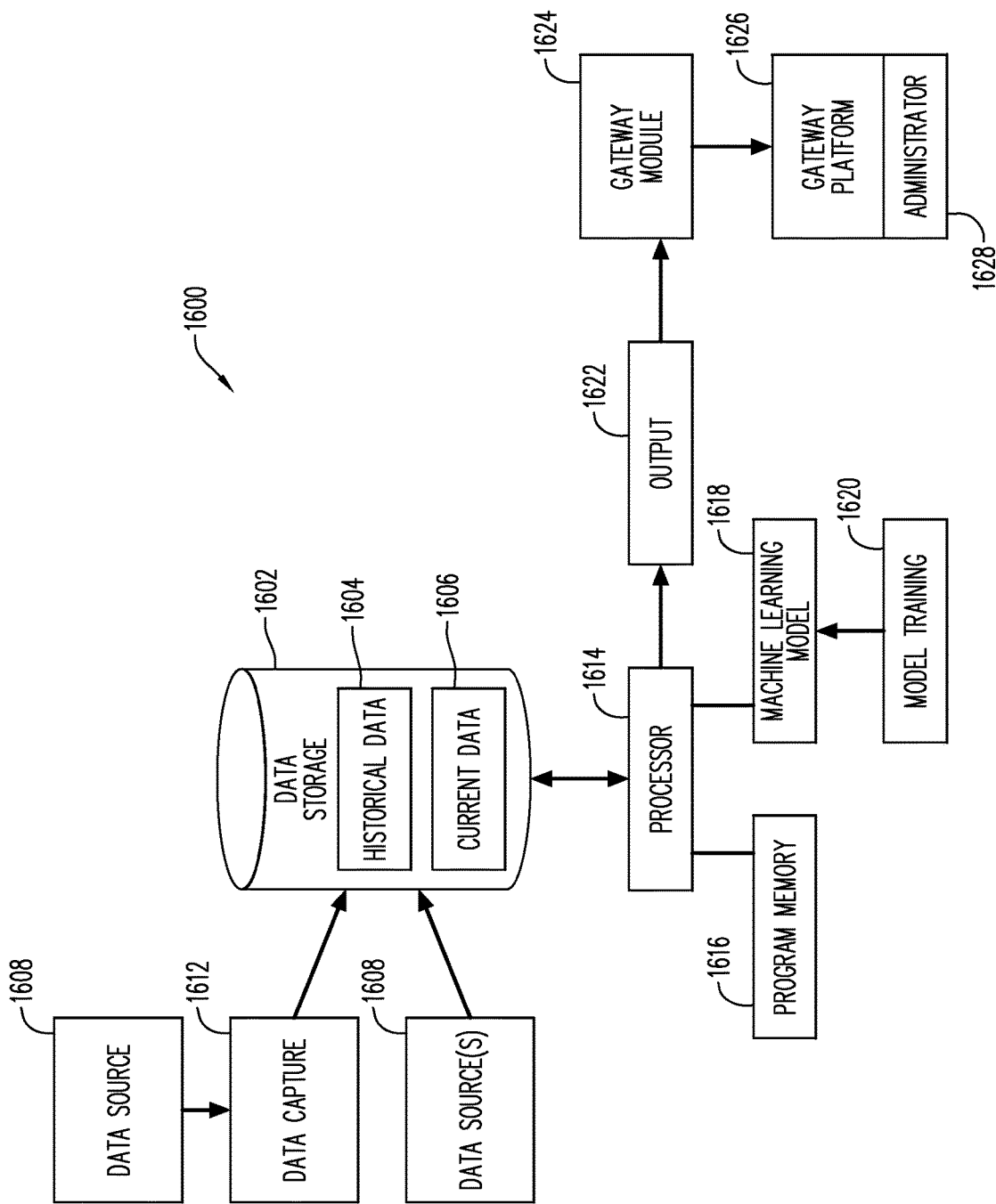
FIG. 16 is a block diagram of a system according to some embodiments.

According to some embodiments, one or more machine learning algorithms and/or predictive models may be used to analyze and vet prompts prior to submission to an LLM. Features of some embodiments associated with a model will now be described by referring to FIG. 16. FIG. 16 is a partially functional block diagram that illustrates aspects of a computer system 1600 provided in accordance with some embodiments of the invention. For present purposes it will be assumed that the computer system 1600 is operated by an insurance company (not separately shown) for the purpose of preventing egress of PII and other confidential information to generative AI models. According to some embodiments, the third-party data and/or internal data may also be used to supplement and leverage the computer system 1600.

The computer system 1600 includes a data storage module 1602. In terms of its hardware the data storage module 1602 may be conventional, and may be composed, for example, by one or more magnetic hard disk drives. A function performed by the data storage module 1602 in the computer system 1600 is to receive, store and provide access to both historical data 1604 and current data 1606. As described in more detail below, the historical data 1604 is employed to train a machine learning model to provide an output that indicates an identified performance metric and/or an algorithm to identify PII and other confidential information, and the current data 1606 is thereafter analyzed by the model. Moreover, as time goes by, and results become known from processing current prompts with PII and confidential data, at least some of the current decisions may be used to perform further training of the model. Consequently, the model may thereby adapt itself to changing conditions.

Either the historical data 1604 and/or the current data 1606 may include, according to some embodiments, prompts with PII and confidential data etc. The data may come from one or more data sources 1608 that are included in the computer system 1600 and are coupled to the data storage module 1602. Non-exhaustive examples of data sources may be the employee or client database (not separately indicated), state DOI databases, etc. It is noted that the data may originate from data sources whereby the data may be extracted from raw files or the like by one or more data capture modules 1612. The data capture module(s) 1612 may be included in the computer system 1600 and coupled directly or indirectly to the data storage module 1602. Examples of the data source(s) 1608 that may be captured by a data capture model 1612 include data storage facilities for big data streams, document images, text files, and web pages (e.g., DOI webpages). Examples of the data capture module(s) 1612 may include one or more optical character readers, a speech recognition device (i.e., speech-to-text conversion), a computer or computers programmed to perform NLP, a computer or computers programmed to identify and extract information from images or video, a computer or computers programmed to detect key words in text files, and a computer or computers programmed to detect PII data regarding an employee or client, etc.

The computer system 1600 also may include a computer processor 1614. The computer processor 1614 may include one or more conventional microprocessors and may operate to execute programmed instructions to provide functionality as described herein. Among other functions, the computer processor 1614 may store and retrieve historical prompts with PII and confidential data 1604 and current data 1606 in and from the data storage module 1602. Thus, the computer processor 1614 may be coupled to the data storage module 1602.

The computer system 1600 may further include a program memory 1616 that is coupled to the computer processor 1614. The program memory 1616 may include one or more fixed storage devices, such as one or more hard disk drives, and one or more volatile storage devices, such as RAM devices. The program memory 1616 may be at least partially integrated with the data storage module 1602. The program memory 1616 may store one or more application programs, an operating system, device drivers, etc., all of which may contain program instruction steps for execution by the computer processor 1614.

The computer system 1600 further includes a machine learning model component 1618. In certain practical embodiments of the computer system 1600, the machine learning model component 1618 may effectively be implemented via the computer processor 1614, one or more application programs stored in the program memory 1616, and computer stored as a result of training operations based on the historical data 1604 (and possibly also data received from a third party). In some embodiments, data arising from model training may be stored in the data storage module 1602, or in a separate computer store (not separately shown). A function of the machine learning model component 1618 may be to identify PII and confidential data in a prompt, etc. The machine learning model component may be directly or indirectly coupled to the data storage module 1602.

The machine learning model component 1618 may operate generally in accordance with conventional principles for machine learning models, except, as noted herein, for at least some of the types of data to which the machine learning model component is applied. Those who are skilled in the art are generally familiar with programming of predictive/machine learning models. It is within the abilities of those who are skilled in the art, if guided by the teachings of this disclosure, to program a predictive/machine learning model to operate as described herein.

Still further, the computer system 1600 includes a model training component 1620. The model training component 1620 may be coupled to the computer processor 1614 (directly or indirectly) and may have the function of training the machine learning model component 1618 based on the historical data 1604 and/or information about PII. (As will be understood from previous discussion, the model training component 1620 may further train the machine learning model component 1618 as further relevant data becomes available.) The model training component 1620 may be embodied at least in part by the computer processor 1614 and one or more application programs stored in the program memory 1616. Thus, the training of the machine learning model component 1618 by the model training component 1620 may occur in accordance with program instructions stored in the program memory 1616 and executed by the computer processor 1614.

In addition, the computer system 1600 may include an output device 1622. The output device 1622 may be coupled to the computer processor 1614. A function of the output device 1622 may be to provide an output that is indicative of (as determined by the trained machine learning model component 1618) identification of PII and confidential data in the prompt. The output may be generated by the computer processor 1614 in accordance with program instructions stored in the program memory 1616 and executed by the computer processor 1614. More specifically, the output may be generated by the computer processor 1614 in response to applying the data for the current simulation to the trained machine learning model component 1618. The output may, for example, include the identification of particular PII and confidential data in the PII, as well as an instruction to sanitize the data, and/or may be the identification of particular PII and confidential data along with a sanitized version of the prompt. In some embodiments, the output device may be implemented by a suitable program or program module executed by the computer processor 1614 in response to operation of the machine learning model component 1618.

Still further, the computer system 1600 may include a gateway module 1624. The gateway module 1624 may be implemented in some embodiments by a software module executed by the computer processor 1614. The gateway module 1624 may have the function of rendering a portion of the display on the output device 1622. Thus, gateway module 1624 may be coupled, at least functionally, to the output device 1622. In some embodiments, for example, the gateway module 1624 may direct communications with an enterprise by referring to an administrator/project leader 1628 via a gateway platform 1626, messages customized and/or generated by the machine learning model component 1618 (e.g., indicating modifications for prompts, alerts or appropriate actions, etc.) and found to be associated with various parties or types of parties.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

Although specific hardware and data configurations have been described herein, note that any number of other configurations may be provided in accordance with embodiments of the present invention (e.g., some of the information associated with the displays described herein may be implemented as a virtual or augmented reality display and/or the database described herein may be combined or stored in external systems.) Moreover, although embodiments have been described with respect to particular types of enterprises (e.g., an insurance company), embodiments may instead be associated with other types of businesses in addition to and/or instead of those described herein (e.g., financial institutions, universities, governmental departments, etc.). Similarly, although certain attributes were described in connection with some embodiments herein, other types of attributes may be used instead. Sill further, the displays and devices illustrated herein are only provided as examples and embodiments may be associated with any other types of user interfaces.

Figure 17:
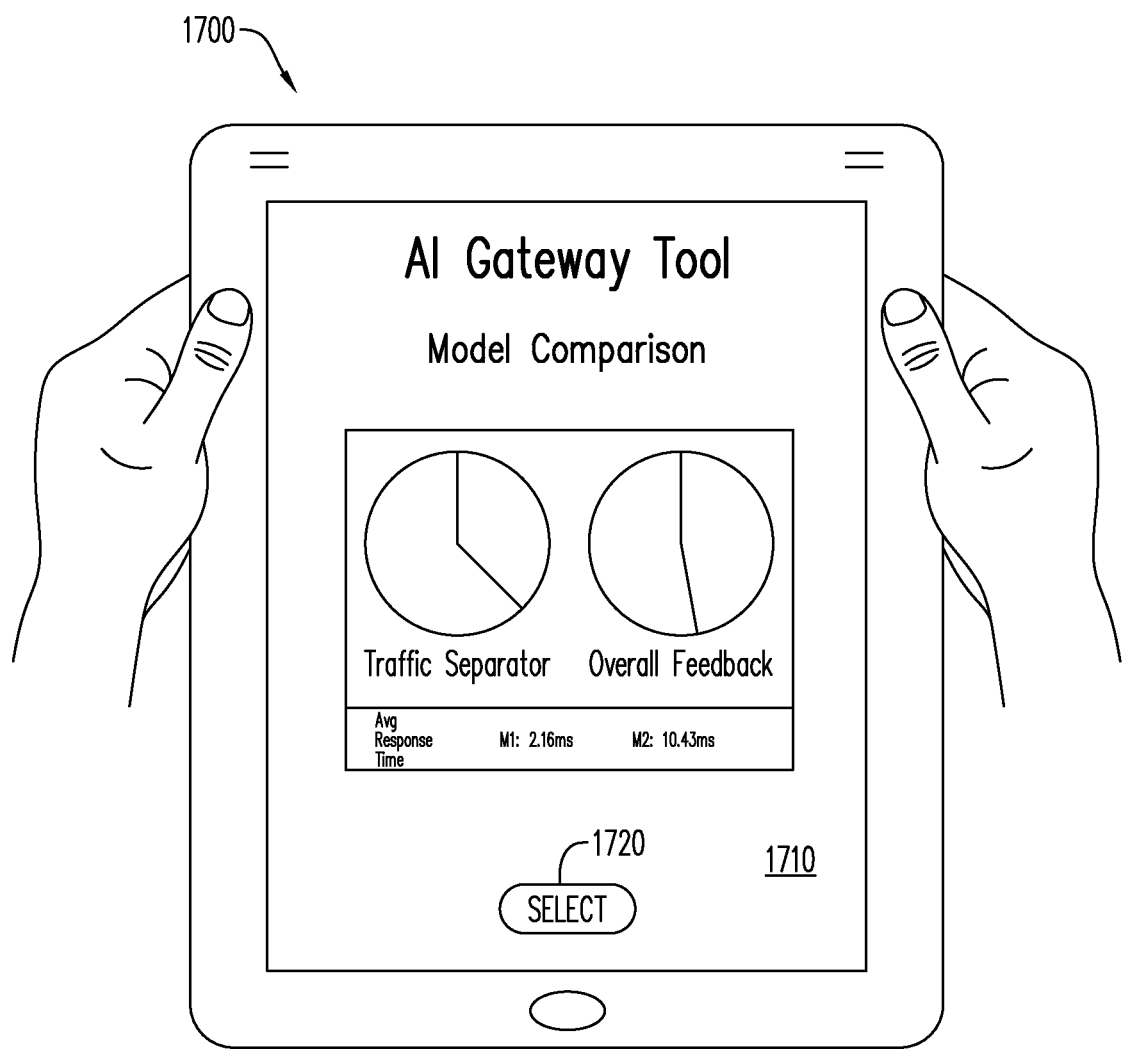
FIG. 17 illustrates a tablet computer displaying a model comparison display user interface according to some embodiments.

For example, FIG. 17 illustrates a handheld tablet computer 1700 showing a Model Comparison display 1710 according to some embodiments. The Model Comparison display 1710 may include a chart that can be selected and/or modified by a user of the handheld computer 1700 (e.g., via a "Select" icon 1720) to access the chart and see more details. The Model Comparison display 1710 may allow a user to see various parameters output from a functional and/or UAT test, for example (e.g., speed of response time, positive feedback from users). Here, the chart also displays (via the "traffic separator" chart) which model more of the prompts were directed to via the UAT test. This may help users and others focus on the parameters that are more important to their selection of a given model to meet their objectives.

Figure 18:
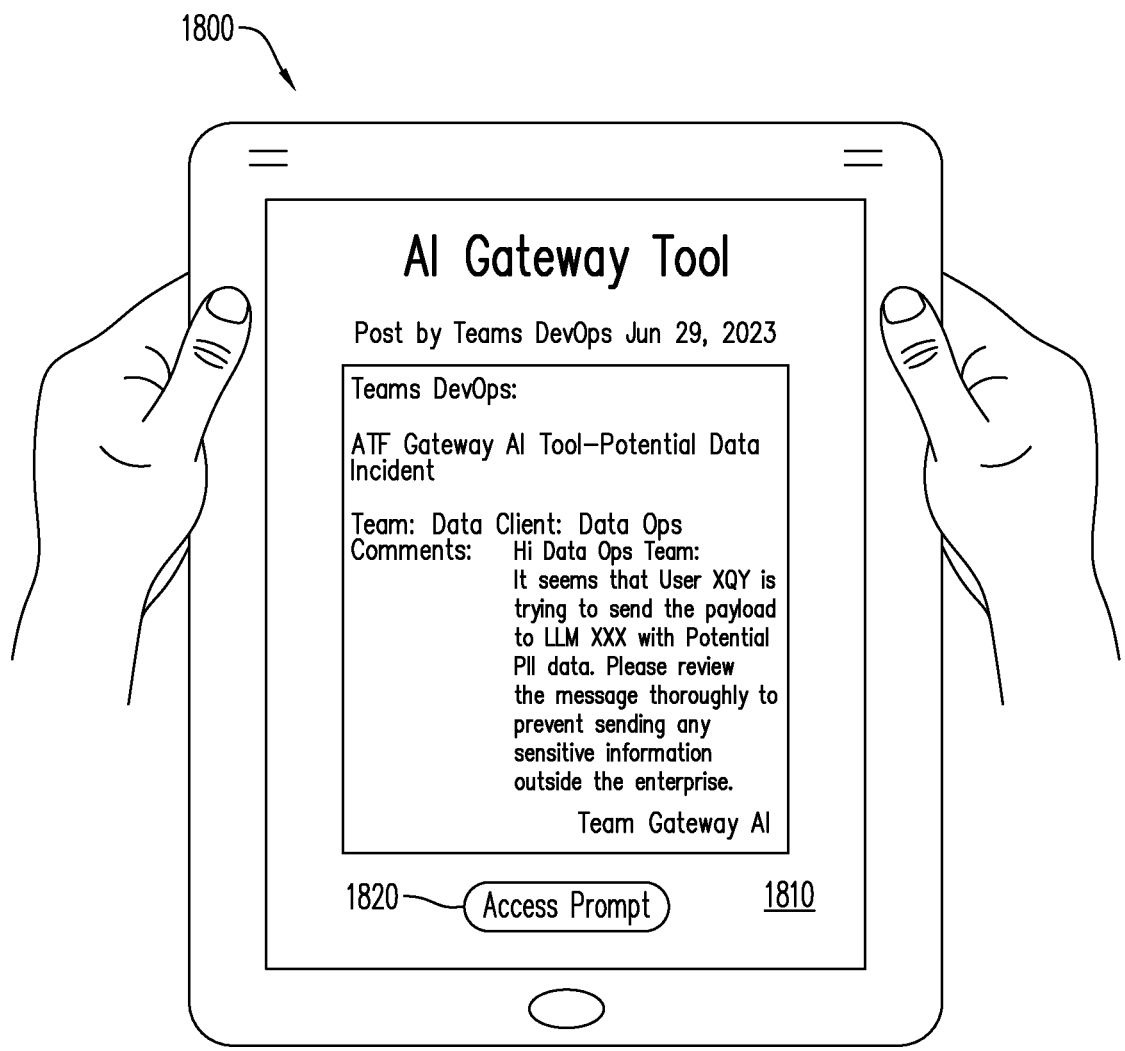
FIG. 18 illustrates a tablet computer displaying a potential data incident message display user interface according to some embodiments.

As another example, FIG. 18 illustrates a handheld tablet computer 1800 showing an alert display 1810 according to some embodiments. The alert display 1810 may include a message indicating that a particular user tried to send a payload with PII data to an LLM. The message may be via any suitable communication platform, including but not limited to MS Teams®. The message may be responded to by a user of the handheld computer 1800. For example, the user may select an "Access prompt" icon 1820 to view the prompt with the PII data.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system implemented via a back-end application computer server of an enterprise, comprising:
 (a) a data store containing enterprise data;
 (a) the back-end application computer server, coupled to the data store, including:
  a computer processor;
  a computer memory coupled to the computer processor and storing instructions that, when executed by the computer processor, cause the back-end application computer server to:
   receive a prompt at at least one of an image component and a text component;
   determine, via execution of at least one of the image component and the text component, a personal identifiable information (PII) status for the prompt, wherein:
    execution of the image component includes accessing a previously created and trained machine learning model, the machine learning model trained with at least one of internal data and internet content;
   return a PII response;
   receive selection of a large language model (LLM) in a case the PII status is PII-free;
   determine a large language model status;
   transmit the prompt to the selected LLM based on the large language model status;
   receive a large language model (LLM) output; and
 (b) a communication port coupled to the back-end application computer server to facilitate an exchange of data with a remote device to support interactive user interface displays that provide information about the LLM output.

2. The system of claim 1, wherein the prompt is received from one of a user and an application.

3. The system of claim 1, wherein at least one of the image component and the text component determines the PII status.

4. The system of claim 3, wherein at least one of the image component and the text component sanitizes the prompt in a case the PII status is "contains PII".

5. The system of claim 1, wherein the PII status is determined based on a presence or absence of PII data.

6. The system of claim 5, wherein PII data includes at least one of:
 (a) a full name, (b) a face, (c) a home address, (d) a social security number, (e) a passport number, (f) a birthdate, (g) a driver's license, (h) a financial information, (i) a medical record, (j) a finger print, (k) a handwriting sample, (l) an email address, and (m) a phone number.

7. The system of claim 1, wherein the determination of the large language model status is based on a comparison of the selected LLM to a list of approved LLMs.

8. The system of claim 1, further comprising instructions to:
 append one or more additional prompts to the received prompt prior to transmission to the selected LLM.

9. The system of claim 1, further comprising instructions to:
 append one or more format parameters for the LLM output to the received prompt prior to transmission of the prompt.

10. A computer-implemented method comprising:
 receiving a prompt at at least one of an image component and a text component;

determining, via execution of at least one of the image component and the text component, a personal identifiable information (PII) status for the prompt, wherein:
execution of the image component includes accessing a previously created and trained machine learning model, the machine learning model trained with at least one of internal data and internet content;
returning a PII response;
receiving selection of a large language model (LLM) in a case the PII status is PII-free;
determining a large language model status;
transmitting the prompt to the selected LLM based on the large language model status; and
receiving a large language model (LLM) output.

11. The method of claim 10, further comprising:
sanitizing, via at least one of the image component and the text component, the prompt in a case the PII status is "contains PII".

12. The method of claim 10, wherein the PII status is determined based on a presence or absence of PII data.

13. The method of claim 12, wherein PII data includes at least one of:
(a) a full name, (b) a face, (c) a home address, (d) a social security number, (e) a passport number, (f) a birthdate, (g) a driver's license, (h) a financial information, (i) a medical record, (j) a finger print, (k) a handwriting sample, (l) an email address, and (m) a phone number.

14. The method of claim 10, wherein the determination of the large language model status is based on a comparison of the selected LLM to a list of approved LLMs.

15. The method of claim 10, further comprising:
appending one or more additional prompts to the received prompt prior to transmission to the selected model.

16. The method of claim 10, further comprising:
appending one or more format parameters for the LLM output to the received prompt prior to transmission of the prompt.

17. A non-transitory computer-readable medium storing instructions adapted to be executed by a computer processor to perform a method comprising:
receiving a prompt at at least one of image component and a text component;
determining, via execution of at least one of the image component and the text component, a personal identifiable information (PII) status for the prompt, wherein:
execution of the image component includes accessing a previously created and trained machine learning model, the machine learning model trained with at least one of internal data and internet content;
returning a PII response;
receiving selection of a large language model (LLM) in a case the PII status is PII-free;
determining a large language model status;
transmitting the prompt to the selected LLM based on the large language model status; and
receiving a large language model (LLM) output.

18. The medium of claim 17, wherein the PII status is determined based on a presence or absence of PII data.

19. The medium of claim 17, wherein the prompt is received from one of a user and an application.

20. The medium of claim 17, further comprising:
appending one or more format parameters for the LLM output to the received prompt prior to transmission of the prompt.

* * * * *